United States Patent Office 3,158,599
Patented Nov. 24, 1964

3,158,599
N-(ARYLCARBAMOYL)- AND N-(ARYLTHIO-CARBAMOYL)-GLUCOSAMINES
Charles Morel, Arlesheim, Basel-Land, Switzerland, assignor to Geigy Chemical Corporation, Ardsley, N.Y., a corporation of Delaware
No Drawing. Filed Feb. 25, 1963, Ser. No. 260,878
Claims priority, application Switzerland, June 21, 1960, 7,017/60
4 Claims. (Cl. 260—211)

This application is a continuation-in-part of my co-pending application Serial No. 118,242, filed June 20, 1961 (abandoned since the filing of the present application).

The present invention relates to new derivatives of glucosamine and more particularly to new N-arylcarbamyl-glucosamines which have valuable pharmacological properties.

The novel compounds are characterized by an N-phenylurea or N-phenylthiourea moiety with from one to two substituents in the benzene nucleus as defined below, and by a D-glucosyl radical at the second nitrogen atom of the urea or thiourea moiety.

Hitherto, phenylureas substituted with 1-desoxy sugar alcohol radicals such as the sorbityl radical and cyclic urethanes thereof have been used as herbicidal compositions, as insecticides, solvents, agents for supplying rewetting properties to wet strength resins in the paper industry, and as depressants of the surface tension of water, foam, stabilizers, and detergents. The cyclic sorbityl-urethanes have also been recommended in agriculture on account of their antibacterial systemic activity and fungicidal activity coupled with their lack of phytotoxicity.

It has now been discovered that, surprisingly, the above-mentioned new compounds which are substituted phenyl-ureas and phenylthioureas containing no 1-desoxy sugar alcohol, i.e., no sorbityl radical, but instead the radical of a reducing sugar, and more particularly a D-glucosyl radical, of the formula

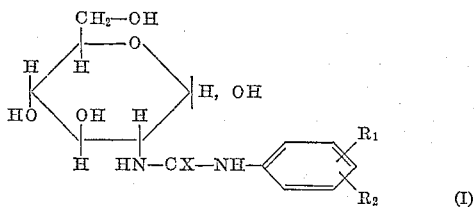

(I)

wherein
$R_1$ represents a member selected from the group consisting of halogen, lower alkyl, trifluoromethyl and nitro,
$R_2$ represents a member selected from the group consisting of hydrogen, halogen and lower alkyl, and
X represents a member selected from the group consisting of oxygen and sulfur,
possess analgetic, antiphlogistic, antipyretic and serotonin-antagonistic activity and are therapeutically useful in the treatment of inflammations of the respiratory system on oral or parenteral administration.

"Lower" in the above definition of Formula I means from 1 to 5 carbon atoms, unless stated otherwise.

In the compounds of the Formula I, $R_1$ is, for example, chlorine, fluorine, bromine, the nitro, trifluoromethyl, methyl, ethyl, n-propyl, isopropyl, n-butyl, isobutyl, tertiary butyl, n-amyl, isoamyl, diethylmethyl, tertiary amyl. $R_2$ is, for example, hydrogen or one of the substituents given for $R_1$ with the exception of the nitro group and the trifluoromethyl group. Of enhanced value are compounds wherein $R_1$ is chlorine, the methyl group or the methoxy group and $R_2$ is hydrogen, chlorine or the methyl group.

The compounds of Formula I are obtained by reacting α- or β-1,3,4,6-tetra-acetyl-D-pyranoglucosamine with a compound of the general formula

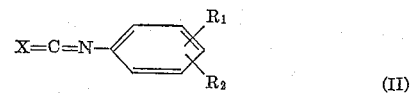

(II)

wherein $R_1$, $R_2$ and X have the meanings given above, and converting the reaction product of the formula

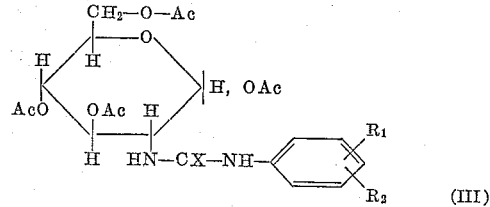

(III)

wherein Ac is the acetyl radical and $R_1$, $R_2$ and X have the meanings given above, by treatment with ammonia in a lower alkanol, preferably with 1 to 3 carbon atoms, into the corresponding compound of the Formula I.

The reaction of α- or β-1,3,4,6-tetra-acetyl-D-pyranoglucosamine with a compound of the Formula II is performed advantageous in a suitable inert organic solvent such as, e.g., benzene, toluene, methylene chloride or dioxan; the reaction is performed at elevated temperature, e.g., at the boiling temperature of the solvent. The splitting off of the acetyl groups in the compounds obtained of the Formula III to convert them into the compounds of the Formula I is performed, for example, by treatment with methanolic or ethanolic ammonia solution at low temperatures, e.g., at room temperature (20° C.).

In the compounds of the Formula I, $R_1$ is, for example, chlorine, fluorine, bromine, nitro, trifluoromethyl, methyl, ethyl, n-propyl, isopropyl, n-butyl, isobutyl, tert. butyl, n-amyl, isoamyl, diethylmethyl, tert. amyl.

$R_2$ is, for example, hydrogen, or one of the substituents given for $R_1$ with the exception of the nitro group and the trifluoromethyl group.

Of particular value are compounds wherein $R_1$ is chlorine, the methyl group or the methoxy group, $R_2$ is hydrogen, chlorine or the methyl group, and X is sulfur.

$R_1$ in Formulas I, II and III can also be a lower alkoxy group, in particular the methoxy group mentioned supra, when X is oxygen, while, when X is sulfur, the reaction proceeds directly to the formation of compounds having a tetrahydroimidazole ring fused with glucosyl ring to form a D-glucopyrano moiety.

The following examples further illustrate the preparation of compounds of Formula I. Parts are given as parts by weight; their relationship to parts by volume is as that of grams to cubic centimeters. The temperatures are in degrees centigrade.

EXAMPLE 1

(a) 3.6 parts of β - 1,3,4,6 - tetra-acetyl-D-pyranoglucosamine (Berichte 64B, 975 (1931)) and 2.1 parts of 3,4-dichlorophenyl isocyanate in 70 parts by volume of anhydrous benzene are boiled under reflux for 2 hours while excluding moisture. After cooling, the β-1,3,4,6-tetra-acetyl-N-(3,4-dichlorophenyl-carbamoyl)-D-pyranoglucosamine is filtered off, washed with benzene and recrystallized from alcohol. M.P. 190–191°, $[\alpha]_D^{24°}$ +36.8°, c.=1.02 in dimethyl formamide.

(b) 5 parts of the above product are dissolved in 50 parts by volume of anhydrous methanol and, at 0°, 100 parts by volume of a solution, saturated at 0°, of ammonia in anhydrous methanol are added. The reaction solution is left to stand for 30 minutes at 0° and then for 3 hours at room temperature, whereupon it is evaporated to dryness in vacuo. The residue is recrystallized from ethanol whereupon N-(3,4-dichlorophenyl-carbamoyl)-D-glucosamine is obtained; M.P. 171–172°, $[\alpha]_D^{22°}$ +32.4°, c.=1 in dimethyl formamide.

EXAMPLE 2

(a) 15 parts of β-1,3,4,6 - tetra-acetyl-D-pyranoglucosamine in 250 parts by volume of anhydrous benzene and 7.8 parts of 3,4-dimethyl phenyl mustard oil are boiled under reflux for 2 hours while excluding moisture. Petroleum ether is then carefully added to the reaction solution until it is just about to become cloudy whereupon the product is left to crystallize. Recrystallized from ethanol, the β-1,3,4,6-tetra-acetyl-N-(3,4-dimethylphenyl-thiocarbamoyl)-D-pyranoglucosamine melts at 157–158°, $[\alpha]_D^{25°}$ +44.9°, c.=1 in dimethyl formamide.

(b) 12 parts of the product obtained according to (a) are dissolved in 50 parts by volume of anhydrous methanol and, at 0°, 400 parts by volume of a solution, saturated at 0°, of ammonia in anhydrous methanol are added. The reaction solution is left for 2 hours at 0° and then for 4 hours at room temperature and afterwards evaporated to dryness in vacuo. The residue is dissolved as far as possible with 30 parts of hot water and, after filtering, the aqueous solution is left to crystallize. The N-(3,4-dimethylphenylthiocarbamoyl)-D-glucosamine melts at 188–189°, $[\alpha]_D^{26°}$ +6.3°, c.=1 in dimethyl formamide.

The following compounds, for example, are also obtained analogously to the above examples from the corresponding starting materials:

Table I

Intermediate of Formula III (limited to β-compounds):

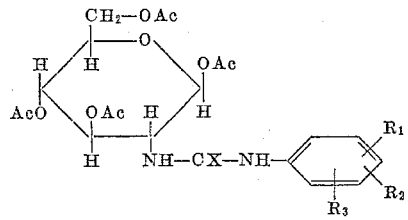

| Expl. No. | ![R1/R2/R3 phenyl] | X | M.P., degrees | When crystallized from— | T (° C.) | $[\alpha]_D^T$ (degrees) | c. in DMF* |
|---|---|---|---|---|---|---|---|
| 3a | 3,4-diCl-phenyl | S | 134–135 | Ether | 24 | +10.9 | 1.05 |
| 4a | 4-Cl-phenyl | O | 209–210 | Ethanol | 24 | +38.4 | 1.02 |
| 5a | 4-Cl-phenyl | S | 160–161 | Methanol | 23 | +25.5 | 1 |
| 6a | 4-NO$_2$-phenyl | O | 220–222 | Ethanol | 24 | +40.9 | 0.98 |
| 7a | 4-CH$_3$-phenyl | O | 200–201 | do | 24 | +38.0 | 1.03 |
| 8a | 4-CH$_3$-phenyl | S | 158–159 | Methanol | 24 | +35.6 | 1.01 |
| 9a | 4-OCH$_3$-phenyl | O | 203–204 | Ethanol | 25 | +35.2 | 1.01 |
| 10a | 3-Cl-phenyl | O | 190–191 | do | 24 | +37.5 | 1.08 |
| 11a | 3-Cl-phenyl | S | 136–137 | do | 25 | +11.1 | 1 |
| 12a | 2,4-diCH$_3$-phenyl | O | 210–211 | do | 25 | +39.1 | 1 |
| 13a | 2,4-diCl-phenyl | O | 202–203 | do | 25 | +37.2 | 1 |
| 14a | 2,4-diCl-phenyl | S | 152–153 | Ether | 24 | +25.8 | 0.98 |

*DMF=dimethyl formamide.

Table II

Compounds of Formula I:

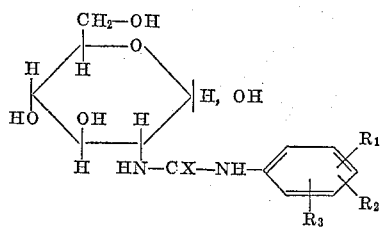

| Expl. No. | R₁/R₂/R₃ group | X | M.P., degrees | When crystallized from— | T (° C.) | $[\alpha]_D^T$ (degrees) | c. in DMF |
|---|---|---|---|---|---|---|---|
| 3b | 3,4-di-Cl-phenyl | S | 180–182 | Ethanol | 23 | −7.3 | 1.01 |
| 4b | 4-Cl-phenyl | O | 171–173 | do | 24 | +88.1 | 0.97 |
| 5b | 4-Cl-phenyl | S | 144–147 | Ethanol/ether | 22 | +30 | [1] 1.08 |
| 6b | 4-NO₂-phenyl | O | 153–155 | Ethanol | 26 | +17.7 | [2] 1 |
| 7b | 4-CH₃-phenyl | O | 179–181 | Ethanol/water | 23 | +45.2 | 1.03 |
| 8b | 4-CH₃-phenyl | S | 154–157 | Ethanol | 22 | +10.2 | 1.01 |
| 9b | 4-OCH₃-phenyl | O | 135–138 | Ethanol/ether | 23 | +13.1 | 1.01 |
| 10b | 3-Cl-phenyl | O | 189–192 | Ethanol/water | 23 | +55.8 | 0.99 |
| 11b | 3,5-di-Cl-phenyl | S | 204–206 | Water | 24 | −21.6 | 1.07 |
| 12b | 3,4-di-CH₃-phenyl | O | 184–186 | Ethanol | 25 | +47.6 | 1.1 |
| 13b | 2,4-di-Cl-phenyl | O | 181–184 | do | 25 | +47.2 | 1.06 |
| 14b | 2,4-di-Cl-phenyl | S | 192–194 | Ethanol/water | 27 | −13.5 | 1.01 |

[1] In ethanol.
[2] DMF/H₂O 9:1.

What I claim is:
1. A compound of the formula

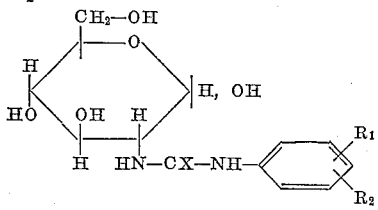

in which
$R_1$ represents a member selected from the group consisting of halogen, lower alkyl, trifluoromethyl and nitro, and, in the case of X being oxygen, also lower alkoxy,
$R_2$ represents a member selected from the group consisting of hydrogen, halogen and lower alkyl, and
X represents a member selected from the group consisting of oxygen and sulfur.

2. N-(3,4-dichlorophenylthiocarbamoyl)-D-glucosamine.

3. N-(3,4-dimethylphenylcarbamoyl)-D-glucosamine.

4. N-(4-chlorophenylcarbamoyl)-D-glucosamine.

References Cited in the file of this patent

UNITED STATES PATENTS

| | | |
|---|---|---|
| 2,139,697 | Salzberg | Dec. 13, 1938 |
| 2,612,497 | Meijer | Sept. 30, 1952 |
| 2,663,729 | Searle et al. | Dec. 22, 1953 |